United States Patent

Brandes

Patent Number: 5,323,077
Date of Patent: Jun. 21, 1994

[54] ELECTRICAL MACHINE HAVING A PERMANENT-MAGNET-EXCITED ROTOR

[75] Inventor: Jürgen Brandes, Bad Neustadt, Fed. Rep. of Germany

[73] Assignee: Siemens Aktinegesellschaft, Munich, Fed. Rep. of Germany

[21] Appl. No.: 971,431

[22] Filed: Nov. 4, 1992

[30] Foreign Application Priority Data

Nov. 7, 1991 [DE] Fed. Rep. of Germany ....... 4136691

[51] Int. Cl.$^5$ ............................................. H02K 21/12
[52] U.S. Cl. ................................. 310/156; 310/185; 310/254
[58] Field of Search .................... 310/254, 156 F, 216, 310/185 F

[56] References Cited

U.S. PATENT DOCUMENTS

| 606,912 | 7/1898 | Blothy | 310/254 UX |
| 2,193,406 | 3/1940 | Goss | 310/254 UX |
| 3,013,166 | 12/1961 | Ellis | 310/254 UX |
| 4,190,779 | 2/1980 | Schaeffer | 310/156 |

FOREIGN PATENT DOCUMENTS

| 0295718 | 12/1988 | European Pat. Off. . | |
| 0307706 | 3/1989 | European Pat. Off. . | |
| 0449538 | 10/1991 | European Pat. Off. | 310/156 |
| 2842195 | 4/1980 | Fed. Rep. of Germany | 310/156 |
| 8816122 | 4/1990 | Fed. Rep. of Germany . | |
| 3844074 | 7/1990 | Fed. Rep. of Germany . | |
| 4002714 | 8/1990 | Fed. Rep. of Germany . | |
| 0315244 | 12/1989 | Japan | 310/156 |
| 0014547 | 5/1898 | Switzerland | 310/254 UX |
| 2026253 | 1/1980 | United Kingdom . | |
| 2220529 | 1/1990 | United Kingdom . | |

OTHER PUBLICATIONS

Patent Abstracts of Japan, vol. 14, No. 496, Oct. 29, 1990 & JP-A-22 06 343 (Sogo Kanko Kaihatsu) Aug. 16, 1990.

etzArchiv, vol. 10 (1988), H. 3, Rolf Mayer et al.: *Reduktion der durch Nutung hervorgerufenen Momentenschwankungen bei umrichtergespeisten Synchronmotoren mit Dauermagneterregung*, pp. 73-82.

Abstract of DE-U-80 18 686, Jul. 22, 1980, Siemens A.G., Berlin & München, Germany: *Dauermagneterregter Laeufer fur eine Elektrische Maschine*.

Primary Examiner—R. Skudy
Attorney, Agent, or Firm—Kenyon & Kenyon

[57] ABSTRACT

The present invention relates to an electrical machine having a permanent-magnet-excited rotor. On the perimeter of the rotor, several plate-like or lamellar permanent magnets are arranged for each rotor pole directly at the air gap adjacent to the stator of the machine. Combinations of stator-slotting harmonic fields and harmonic fields based on the division of the magnets that lead to oscillating torques. These oscillating torques are largely suppressed by having the total number of permanent magnets configured on the rotor correspond to a prime number greater than three.

6 Claims, 2 Drawing Sheets

ELECTRICAL MACHINE HAVING A PERMANENT-MAGNET-EXCITED ROTOR

BACKGROUND OF THE INVENTION

The invention relates to an electrical machine having a permanent-magnet-excited rotor, and more particularly, a rotor of an electrical machine having several plate-like or lamellar permanent magnets arranged on its perimeter for each rotor pole at a point directly at the air gap adjacent to the stator of the machine.

An electrical machine having a permanent-magnet-excited rotor is described in German Patent No. U-80 18 686. Due to production engineering and cost considerations, the permanent magnets used for these types of rotors are designed as flat, rectilinear plates or strips. In the case of one rotor, if several permanent magnets are configured side-by-side on the rotor perimeter for each rotor pole, then irregularities in the magnetic field of the individual rotor poles result because of the finite gaps between the individual, adjoining magnets. These irregularities cause harmonic fields, which when combined with stator winding and stator slotting fields, can produce oscillating torques.

It would be advantageous to provide an electrical machine having a permanent-magnet-excited rotor designed to avoid oscillating torques caused by the interaction of stator and rotor harmonic fields.

SUMMARY OF THE INVENTION

This advantage is provided by the present invention by having the total number of permanent magnets, Z, configured on the rotor correspond to a number which is not integrally divisible by the stator slot number, N, nor by the pole number, p, of the machine. In a preferred embodiment, the total number of permanent magnets is a prime number greater than three. A rotor having such specifications prevents harmonic fields based on the division of the permanent magnets per rotor pole from interacting with harmonic fields caused by the stator slotting. Oscillating torque that would have been caused by such an interaction is eliminated.

In a further embodiment, the magnetic longitudinal axis of the rotor poles and/or the stator slots are skewed in relationship to the longitudinal axis of the rotor (e.g., see FIG. 3 where the stator slots 10 are skewed from the axis 11 of the rotor). This reduces the magnitude of the oscillating torques resulting from the interaction between the stator slotting fields and the permanent-magnet harmonic fields. Skewing the magnetic longitudinal axis of the rotor poles is easier from a production engineering standpoint than skewing the longitudinal axis of the stator slots, and it is expedient to undertake only one skewing of a magnetic longitudinal axis. Advantageous results are achieved with a skewing by the measure of one slot pitch. Skewing by the measure of one slot pitch means that the position of the magnetic longitudinal axis on the one front end of the rotor is shifted in the circumferential direction opposite the position on the other front end of the rotor by the center-to-center distance between two adjoining slots of the stator.

DETAILED DESCRIPTION

Figure 1:
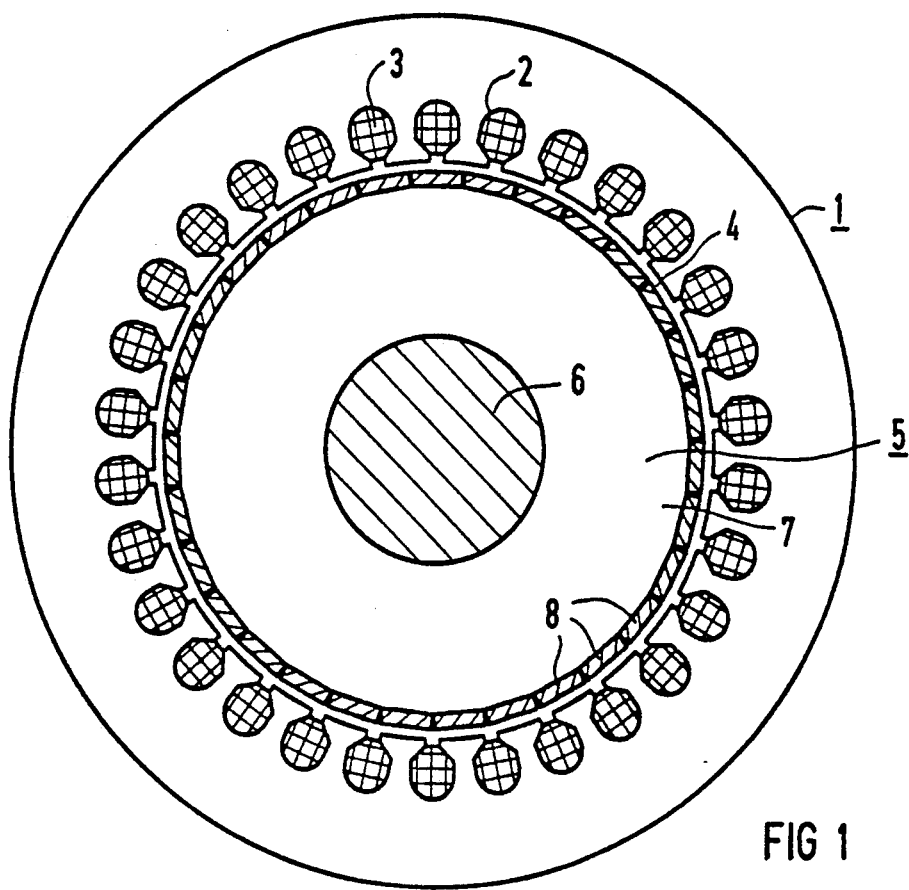
FIG. 1 is a cross-sectional view of an electrical machine.
Figure 3:
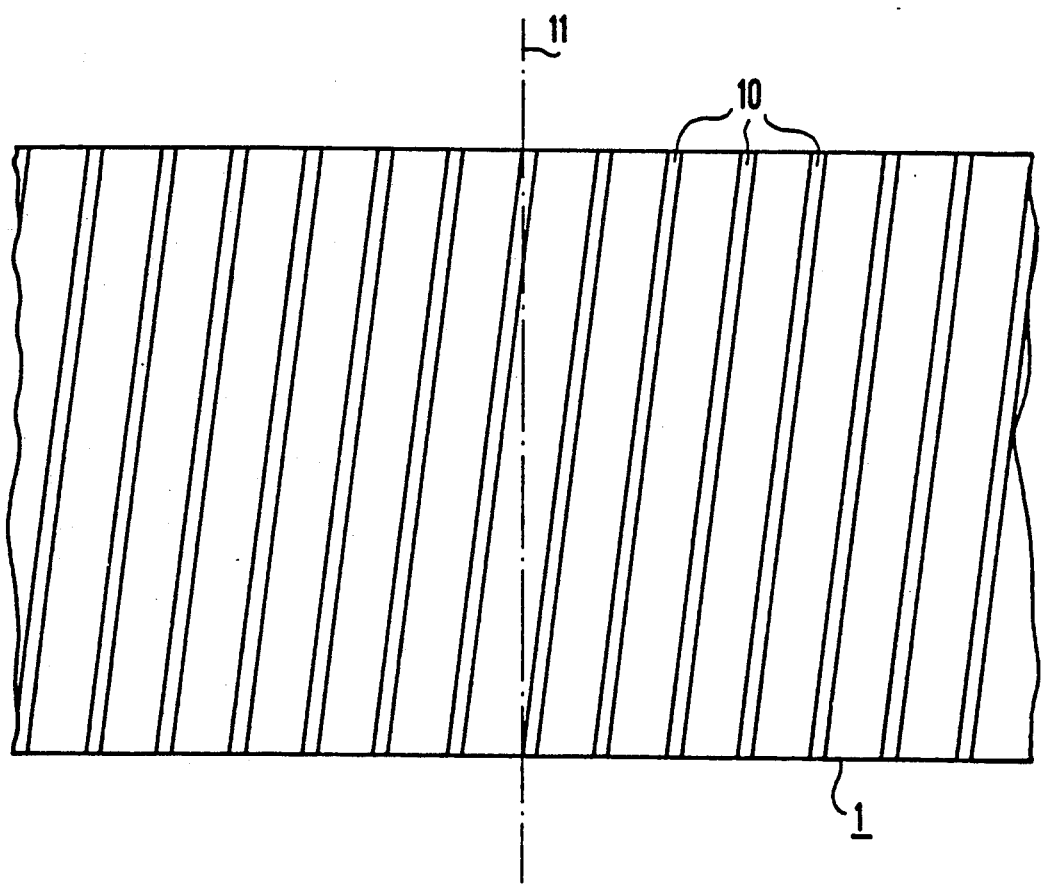
FIG. 3 is a partial view of a stator having skewed stator slots.

Referring to FIG. 1, an electrical machine is shown where reference numeral 1 denotes the stator. The stator winding 3 of the machine is arranged in the stator slots 2 of the stator 1 of circumferential shape. A rotatably supported rotor 5 is installed in the stator bore 4 of the stator 1.

The rotor 5 comprises a shaft 6, on which is mounted a laminated rotor core 7. Lamellar permanent magnets 8 are fitted on the periphery of the laminated rotor core 7, and a uniform distribution of the permanent magnets 8 on the rotor circumference is necessary. The number of permanent magnets 8 provided on the periphery of the laminated rotor core 7 corresponds to a prime number. In this embodiment, 31 permanent magnets 8 are arranged on the rotor circumference.

Figure 2:
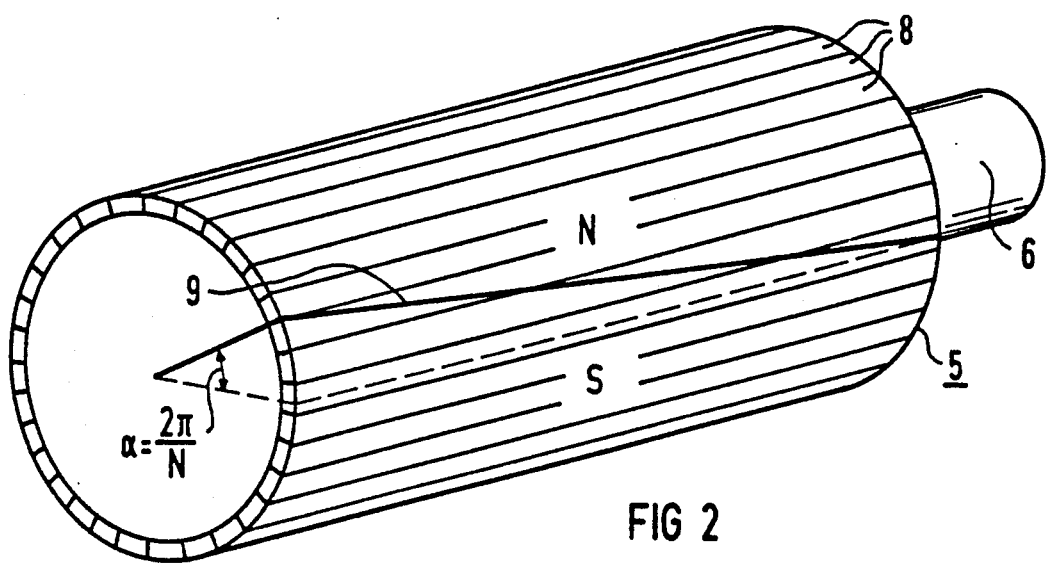
FIG. 2 is a perspective view of a rotor equipped with permanent magnets constructed according to the present invention.

The permanent magnets 8 are magnetized such that several of the permanent magnets 8, arranged spatially side-by-side, form one rotor pole (north pole or south pole) in each case. Referring to FIG. 2, the magnetization of the permanent magnets 8 is such that the transition from one polarity to the other follows along a diagonally running line 9. Thus, the magnetic longitudinal axis of the rotor poles N, S is skewed in relationship to the longitudinal axis of the rotor 5, or rather in relationship to the stator slots 10 running parallel to the longitudinal axis of the rotor 5. This skewing angle, α, is preferably $2\pi/N$, where N is the number of slots 10 in the stator.

In the electrical machine of the present invention, all stator slots 10 can be wound, whereby the same coil pitch is obtained for all coils of the stator winding. Moreover, the rotor is uniformly covered with permanent-magnet material over its entire periphery, so that manifestations of imbalance are avoided. Thus, each rotor pole is covered with magnetic material over its full pole width.

What is claimed is:

1. An electrical machine having a number, p, of poles, comprising:
   a stator having a circumference and a number, N, of stator slots uniformly distributed over an entire circumference of the stator;
   a permanent-magnet-excited rotor having a perimeter and at least two rotor poles, said rotor being separated from said stator by an air gap;
   a plurality of plate-like permanent magnets arranged on the perimeter of said rotor for each rotor pole directly at the air gap adjacent to said stator, such that a total number of said permanent magnets configured on said rotor corresponds to a number, Z, which is not integrally divisible by said number of stator slots, N, nor by a number of poles, p, of the electrical machine.

2. The electrical machine of claim 1, wherein the total number of plate-like permanent magnets configured on said rotor corresponds to a prime number greater than three.

3. The electrical machine of claim 1, wherein said rotor poles have a magnetic longitudinal axis, such that at least one of the magnetic longitudinal axis of the rotor poles and the stator slots of the electrical machine are skewed in relationship to a longitudinal axis of said rotor.

4. The electrical machine of claim 2, wherein said rotor poles have a magnetic longitudinal axis, such that at least one of the magnetic longitudinal axis of the rotor poles and the stator slots of the electrical machine are skewed in relationship to a longitudinal axis of said rotor.

5. The electrical machine of claim 3, wherein the magnetic longitudinal axis of the rotor poles is skewed by a measure of one slot pitch in relationship to the longitudinal axis.

6. The electrical machine of claim 4, wherein the magnetic longitudinal axis of the rotor poles is skewed by a measure of one slot pitch in relationship to the longitudinal axis.

* * * * *